United States Patent
Habers et al.

(10) Patent No.: US 10,871,387 B2
(45) Date of Patent: Dec. 22, 2020

(54) DOMESTIC WATER METER

(71) Applicant: Georg Fischer JRG AG, Sissach (CH)

(72) Inventors: Rene Habers, Troisdorf (DE); Bernd Schuster, Stetten (CH)

(73) Assignee: Georg Fischer JRG AG (CH)

( * ) Notice: Subject to any disclaimer, the term of this patent is extended or adjusted under 35 U.S.C. 154(b) by 214 days.

(21) Appl. No.: 16/104,239

(22) Filed: Aug. 17, 2018

(65) Prior Publication Data
US 2019/0056252 A1 Feb. 21, 2019

(30) Foreign Application Priority Data

Aug. 18, 2017 (CH) .................................... 1035/17

(51) Int. Cl.
  *G01F 1/06* (2006.01)
  *E03B 7/07* (2006.01)
  *E03B 7/04* (2006.01)

(52) U.S. Cl.
  CPC .................. *G01F 1/06* (2013.01); *E03B 7/04* (2013.01); *E03B 7/072* (2013.01)

(58) Field of Classification Search
  CPC ... E03B 7/04; E03B 7/072; G01F 1/06; G01F 1/74; G01F 1/684; G01F 1/00
  USPC ............................................................ 73/195
  See application file for complete search history.

(56) References Cited

U.S. PATENT DOCUMENTS 4,338,816 A * 7/1982 Neff ........................ G01F 13/00
                                                 73/114.52

FOREIGN PATENT DOCUMENTS

DE       102005024252 A1 * 11/2006 ............... E03B 7/04

* cited by examiner

*Primary Examiner* — John Fitzgerald
*Assistant Examiner* — Truong D Phan
(74) *Attorney, Agent, or Firm* — Harness, Dickey & Pierce, P.L.C.

(57) ABSTRACT

Method and measuring device for determining the drinking water consumption in a drinking water system preferably in a building, includes a riser and a plurality of ring lines which branch off therefrom and rejoin in the direction of flow, wherein each ring line has at least one consuming fixture and at least one measuring device, and wherein the consumption of the drinking water in each ring line is determined with a separate measuring device.

4 Claims, 2 Drawing Sheets

DOMESTIC WATER METER

CROSS-REFERENCE TO RELATED APPLICATION

This application claims the benefit and priority of Swiss Patent Application No. 01035/17, filed Aug. 18, 2017. The entire disclosure of the above application is incorporated herein by reference.

BACKGROUND

Technical Field

The invention relates to a method for determining the drinking water consumption in a drinking water system preferably in a building, comprising a riser and a plurality of ring lines which branch off therefrom and rejoin it in the direction of flow, wherein each ring line has at least one consuming fixture and one measuring device.

Such piping types or drinking water systems are known and offer the advantage that no separate flushing operation in rarely used line sections is any longer necessary. In rarely used tapping points or consuming fixtures in a tree-structure-based piping, there has been a need for regular flushing or they tend to become contaminated.

DE 17 10 90 U1 discloses a corresponding system with ring lines, which system is geared to ultra-pure water, but is also applicable to drinking water and is nowadays also adopted in buildings.

A drinking water system which has been installed in this way, preferably in buildings, contains a riser having outgoing ring lines on which is disposed at least one consuming fixture, this can be a toilet, shower, bath tub, outdoor tap, or else a tapping point for drinking water. By virtue of this arrangement, a regular flow through the ring lines is ensured, since, when drinking water is drawn off in an upper ring line, the flow through the other ring lines which are likewise connected to the same riser is also stimulated.

A drawback with the line systems with ring line is, however, that the individual drinking water consumptions in the respective ring lines cannot be determined. That is to say, therefore, in a building, for example, containing several tenants, it is only possible to determine the drinking water consumption for each tenant if ring lines are dispensed with and a tree structure is provided as the piping, which in turn leads to contaminations in rarely used consuming fixtures. Alternatively thereto, the possibility exists of providing ring lines, and thus avoiding contamination of the water, in respect of all consuming fixtures, but not the possibility of determining the drinking water consumption for each ring line.

SUMMARY OF INVENTION

An aspect of the invention is to propose a method and a therewith associated measuring device which, despite ring lines in a drinking water system, makes it possible to determine the consumption in each separate ring line.

This aspect is achieved according to the invention by virtue of the fact that the consumption of the drinking water in each ring line is determined with a separate measuring device, wherein the measuring device has a port for the feed line and return line of the ring line.

The method according to the preferred embodiment of the invention relates to the determination of the drinking water consumption in a drinking water system preferably of a building. The building preferably has several tenants, which are respectively assigned to a separate ring line. The ring lines are connected to one another via a riser. On the riser, a plurality of ring lines branch off and rejoin the riser above the branch-off point in the direction of flow. On the ring lines is respectively arranged at least one consuming fixture, such as a toilet, bath tub, outdoor tap, or else a tapping point. By means of at least one measuring device, the through-flow is determined for each ring line, wherein each ring line has a separate measuring device with which the consumption in the respective ring line is determined.

Preferably, by means of the measuring device in each ring line, the consumed drinking water, as well as the drinking water circulating through the ring line, is determined separately. This makes it possible for only the consumption for each ring line to be registered, and for the circulating drinking water to not also be regarded as consumption. That is to say, for instance, that if, at an upper ring line, drinking water is drawn off, drinking water flows also through the lower ring lines but is not drawn off there, but rather the consumption only in an upper ring line is registered as consumption by the measuring device and the lower ring lines recognize this as through-flowing drinking water and charge this to account or display this accordingly.

It is advantageous if the measuring devices of the ring lines for determining the drinking water consumption communicate with one another or exchange the registered flow volumes and charge these to account accordingly, so that it is possible to exactly determine and reconcile where a specific volume of drinking water has flowed through and in which ring line the drinking water was consumed.

It has been shown to be a preferred embodiment if the measuring devices are connected to one another via a central unit 9. This enables an improved registration and reconciliation of the registered flow volumes of the individual measuring devices.

It is advantageous if the measuring devices are flowed through by the drinking water of the feed line and return line of the ring line, wherein the direction of flow can vary. That is to say, the measuring device has at least one port for the feed line of the ring line or for that line portion of the ring line which leads away from the riser towards the consuming fixtures, and a port for the return line of the ring line or for that line portion of the ring line which leads away from the consuming fixtures and back towards the riser and meets up therewith. This requires that the direction of flow can vary, that is to say that, for example, the flow in the return line can lead in the direction of the riser if the drinking water draw-off takes place in an above-disposed ring line, but also that it can lead away from the riser if the drinking water draw-off takes place in the respective ring line, so that the consuming fixture receives an oncoming flow from both sides of the ring line. This requires that the measuring device recognizes the corresponding direction of flow and charges to account accordingly.

The measuring device according to the invention for determining the drinking water consumption in a drinking water system preferably in a building, comprising a riser and a plurality of ring lines which branch off therefrom and rejoin it in the direction of flow, wherein each ring line has at least one consuming fixture, has a port for the feed line and return line of the ring line. As already mentioned previously, this serves for the complete registration and assignment of the drinking water which circulates through the ring line and which is consumed.

It is advantageous, in order to appropriately register the flow volume, if the measuring device has at least two flow meters. In the feed line, as in the return line, the flow can hence be determined separately. Moreover, it can preferably be determined on the basis of the direction of flow whether the flowed-through drinking water should be calculated as consumption or as circulating drinking water.

A preferred embodiment consists in the fact that at least one of the flow meters, in dependence on the direction of flow of the through-flowing drinking water, adds the flow volume to the consumption or subtracts it. That is to say that, as already mentioned, the appropriate through-flow direction, preferably in the return line, is determinant of whether the volume in the appropriate ring line is added or subtracted. This registered value can, however, also be used to balance or define the flow volumes in the other ring lines, since the measuring devices preferably communicate with one another.

It has been shown to be advantageous if the flow meters are of mechanical and/or electronic configuration. As a mechanical variant, a rotor is conceivable, but an electronic variant by means of sensors, specifically by means of ultrasound, is also conceivable, however.

BRIEF DESCRIPTION OF THE DRAWINGS

An illustrative embodiment of the invention is described with reference to the figures, though the invention is not just limited to the illustrative embodiment, wherein.

DETAILED DESCRIPTION OF THE PREFERRED EMBODIMENTS

Figure 1:
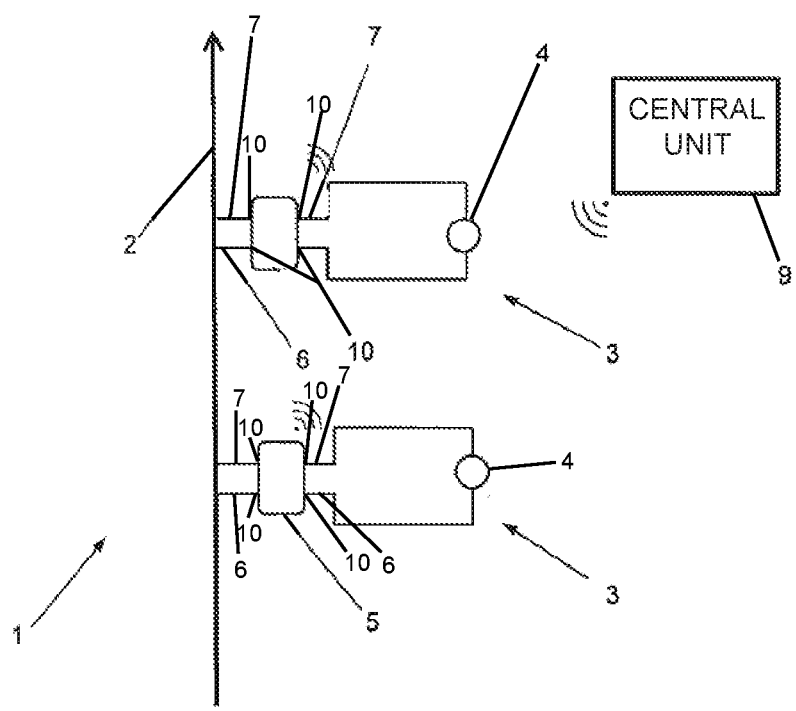
FIG. 1 shows a schematic depiction of a drinking water system comprising two ring lines and a riser.

The drawing represented in FIG. 1 shows a schematic representation of a drinking water system 1 according to the method according to the invention. The drinking water system 1 has a riser 2 on which the ring lines 3 branch off and rejoin it. In the depicted FIG. 1 two ring lines 3 are arranged, though also a different number of ring lines 3 can obviously be arranged on a riser 2.

Such drinking water systems can mostly be found in buildings which ensure regular flushing of the ring lines 3, that it so say, if drinking water is drawn off at the consuming fixture 4 of the upper ring line, that also produces a flow in the lower ring line 3, since, via the riser 2, the drinking water is also drawn jointly out of the lower ring line(s) 3. In order to obtain, as far as possible, no bacteria in the drinking water system, a regularly repeated flushing of this kind is optimal.

With the measuring devices 5, which are preferably respectively arranged for each ring line 3, it is possible to determine the drinking water consumption per unit or per ring line 3. That is to say, via the feed line 6, the drinking water flows into the ring line 3 to the consuming fixture 4, though the drinking water can also, moreover, flow to the consuming fixture via the return line 7 of the ring line 3, as can clearly be seen in FIG. 2.

Figure 2:
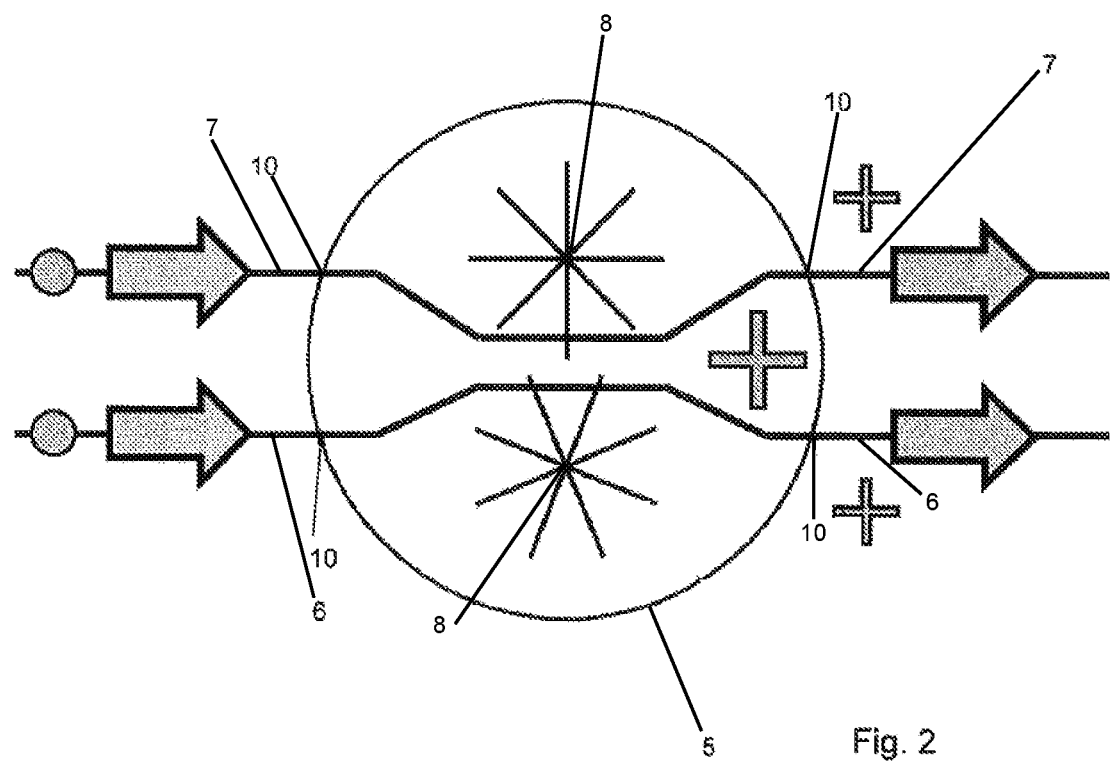
FIG. 2 shows a schematic depiction of a measuring device according to the invention in a ring line, wherein the consumption takes place in the depicted ring line (consumption in the appropriate ring line)
Figure 3:
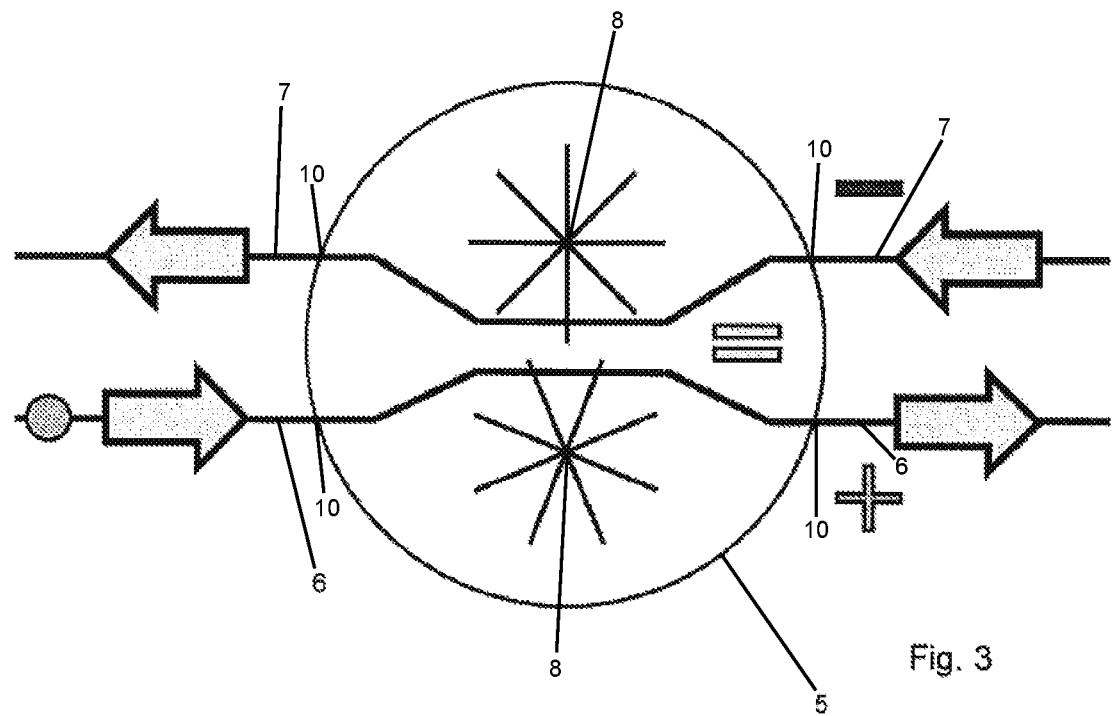
FIG. 3 shows a schematic depiction of a measuring device according to the invention in a lower ring line, wherein the consumption takes place in an above-disposed ring line (no consumption in the appropriate ring line).

The measuring devices 5 comprising preferably a plurality of, especially preferably two, flow meters 8, which in FIGS. 2 and 3 are represented schematically, but not restrictively, as rotors, but can also be configured as sensors or work electronically, demonstrate the determination of the flow volume. That is to say, if an inflow takes place from both sides of the ring line 3, the flow volume is respectively added, that is also to say the consuming fixture is located in this ring line 3.

There is also the possibility, however, as represented in FIG. 3, that drinking water is drawn off at a consuming fixture 4 in the above-disposed ring line 3 (not represented) and the drinking water hence flows out of the underlying ring lines 3 back into the riser 2, and flows into the above ring line in which the consumption takes place. In FIG. 3, the measuring device 5 of a below-situated ring line 3, through which the drinking water circulates and thus is only consumed in the upper ring line, is represented.

In order to calculate this accordingly, at least one of the flow meters 8 can determine that a different direction of flow exists and thus no consumption takes place in this ring line 3, and charges that to account in accordance with the drinking water which has flowed in via the feed line.

What is claimed is:

1. A drinking water system for measuring consumption and circulation of drinking water, the drinking water system comprising:
    a riser;
    a plurality of ring lines, each one of the plurality of ring lines branches off from the riser and rejoins to the riser;
    at least one consuming fixture connected to each one of the plurality of ring lines; and
    a plurality of measuring devices, each one of the plurality of measuring devices is placed along the plurality of ring lines and configured to measure consumption of drinking water therefrom;
    wherein at least one of the plurality of measuring devices is configured to separately measure consumption of drinking water from the at least one consuming fixture, and at least one of the plurality of measuring devices is configured to measure circulation of drinking water through at least one of the plurality of ring lines.

2. The drinking water system according to claim 1, wherein the plurality of measuring devices communicate with one another to exchange measured flow volumes.

3. The drinking water system according to claim 1, further comprising a central unit connecting the plurality of measuring devices.

4. The drinking water system according to claim 1, wherein each one of the plurality of ring lines includes a feed line extending from the riser to the at least one consuming fixture, and a return line returning from the at least one consuming fixture to the riser;
    wherein each one of the plurality of measuring devices is placed along both the feed line and the return line; and
    wherein each one of the plurality of measuring devices is configured to measure flow of the drinking water: along the feed line to the consuming fixture, along the return line from the consuming fixture, and along the return line to the consuming fixture.

* * * * *